(12) United States Patent
Kimura

(10) Patent No.: US 6,215,817 B1
(45) Date of Patent: Apr. 10, 2001

(54) SERIAL INTERFACE DEVICE

(75) Inventor: Masato Kimura, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/017,025

(22) Filed: Feb. 2, 1998

(30) Foreign Application Priority Data

May 27, 1997 (JP) .................................................... 9-136531

(51) Int. Cl.[7] .................................. H04B 1/38; H04L 5/16
(52) U.S. Cl. .............................................. 375/220; 375/360
(58) Field of Search ..................................... 375/354, 356, 375/357, 360, 365, 368, 369, 220, 219, 224; 327/141, 160; 370/503, 512, 509

(56) References Cited

U.S. PATENT DOCUMENTS 4,477,912 * 10/1984 Russell .
4,527,275 * 7/1985 Russel .
5,430,771 * 7/1995 Fix et al. .............................. 375/354

* cited by examiner

Primary Examiner—Chi H. Pham
Assistant Examiner—Jean B. Corrielus
(74) Attorney, Agent, or Firm—Venable; Robert J. Frank; Michael A. Sartori

(57) ABSTRACT

A serial interface circuit is compatible with a three-wire interface, but uses only one or two wires. One wire is a data signal line. The other wire, if present, is a scan signal line or clock signal line. If only one wire is used, the serial interface circuit detects the start of a communication period by detecting a synchronization pattern, and generates a clock signal, approximately synchronized to the clock signal used at the partner interface circuit, by dividing a higher-frequency clock signal. The partner interface circuit can operate as if a three-wire interface were being used.

14 Claims, 5 Drawing Sheets

SERIAL INTERFACE DEVICE

BACKGROUND OF THE INVENTION

The present invention relates to a serial interface circuit useful, for example, in communication with supervisory and control equipment in telecommunication systems, including digital transmission systems, digital switching systems, and the like.

In such systems, it is common for a single supervisory and control unit to supervise and control a plurality of other units, such as switching units or trunk line units. Each of the supervised and controlled units is conventionally coupled to the supervisory and control unit by a clock signal line, a data signal line, and a scan signal line, forming a three-wire interface. Data are sent and received serially on the data signal line in synchronization with the clock signal, during intervals designated by the scan signal. The clock and scan signals are supplied by the supervisory and control unit.

A problem with this three-wire interface is the number of wires. When the supervisory and control unit is coupled to many supervised and controlled units, the labor involved in connecting three times that many interface wires during equipment installation, and checking the connections during equipment maintenance, is considerable. In addition, the supervised and controlled units have much wiring of their own, and it may be difficult to find space for three interface wires in locations where the wires will not be affected by crosstalk, and will not cause crosstalk in other signal lines.

It would therefore be desirable to replace the three-wire interface with an interface having fewer wires, such as one of various standard two-wire interfaces. Changing over to one of these standard interfaces, however, would require major alterations in signaling formats and protocols, and corresponding modifications of the circuits that transmit, receive, and process the interface signals. Telecommunication system operators are understandably reluctant to make such far-reaching changes in equipment carrying high volumes of public telephone or data traffic.

SUMMARY OF THE INVENTION

It is accordingly an object of the present invention to provide a serial interface that is compatible with a three-wire interface, but requires fewer than three wires.

According to a first aspect of the invention, a serial interface circuit is coupled by a data signal line and a scan signal line to a partner interface circuit. On the scan signal line, the partner interface circuit transmits a scan signal indicating the beginning of a communication period. On the data signal line, the partner interface circuit transmits data, for at least part of the communication period, in synchronization with a first clock signal which is not transmitted.

In the serial interface circuit, a clock oscillator generates a second clock signal having N times the frequency of the first clock signal, where N is an integer greater than one. A clock frequency divider divides the frequency of the second clock signal by N, generating a divided clock signal, the phase of which is referenced to the scan signal. A data transceiver receives data on the data signal line in synchronization with the divided clock signal, and may also transmit data on the data signal line in synchronization with the divided clock signal.

According to a second aspect of the invention, the serial interface circuit is coupled by a data signal line and a clock signal line to the partner interface circuit. The partner interface circuit transmits data on the data signal line, in synchronization with a clock signal transmitted on the clock signal line. The data transmitted in each communication period start with a synchronization pattern.

In the serial interface circuit, a receiving shift register receives and stores data from the data signal line, in synchronization with the clock signal. A data comparator detects a timing when data stored in the receiving shift register match the synchronization pattern. A data transceiver recognizes this timing as the start of a communication period, and begins receiving data. The data transceiver may also transmit data.

According to a third aspect of the invention, the serial interface circuit is coupled only by a data signal line to the partner interface circuit. The partner interface circuit transmits data in synchronization with a non-transmitted first clock signal, in communication periods that begin with the transmission of a synchronization pattern.

In the serial interface circuit, a clock oscillator generates a second clock signal with N times the frequency of the first clock signal. A shift register with a length at least N times the length of the synchronization pattern receives and stores data from the data signal line, in synchronization with the second clock signal. A data comparator outputs a synchronization signal when the data stored in the shift register have a bit pattern matching the synchronization pattern, with each bit in the synchronization pattern repeated N times. A clock frequency divider divides the frequency of the second clock signal by N, generating a divided clock signal, the phase of which is referenced to the synchronization signal. A data transceiver receives data on the data signal line in synchronization with the divided clock signal, and may also transmit data on the data signal line in synchronization with the divided clock signal.

DETAILED DESCRIPTION OF THE INVENTION

Embodiments of the invention will be described with reference to the attached illustrative drawings.

Figure 1:
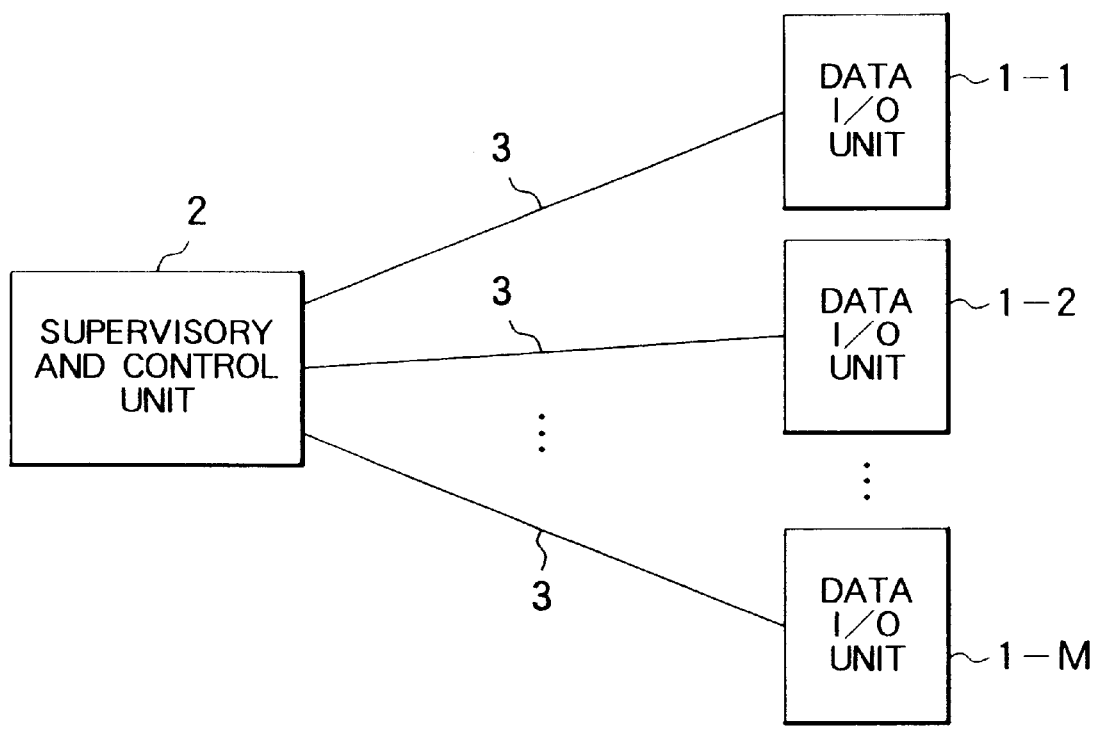
FIG. 1 illustrates a type of system in which the invention can be employed.

As one example of a system in which the invention can be usefully practiced, FIG. 1 illustrates the connection of a plurality of data input/output units 1-1 to 1-M to a single supervisory and control unit 2 in a star topology (where M is an integer greater than one). The data input/output units 1-1 to 1-M may be, for example, trunk line units, carrying data on numerous telecommunication channels.

Physically, the data input/output units 1-1 to 1-M and supervisory and control unit 2 may be rack-mounted modules, printed circuit boards, or the like. The interface signal lines 3 coupling each of the data input/output units 1-1 to 1-M to the supervisory and control unit 2 comprise a pair of signal lines in the first and second embodiments below, and a single signal line in the third embodiment. One of the signal lines is always a serial data signal line.

The serial interface circuits described in the following embodiments are disposed in the data input/output units 1-1 to 1-M. The partner interface circuit is disposed in the supervisory and control unit 2.

Figure 2:
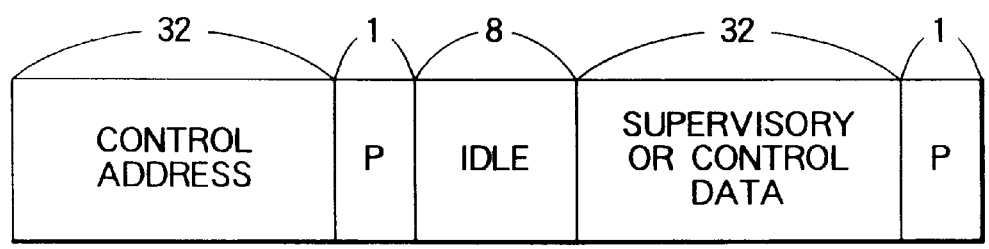
FIG. 2 illustrates the format of data transmitted and received in this system.

FIG. 2 illustrates the data format used on the data signal line in all three embodiments. During the first part of a communication period, the partner interface circuit in the supervisory and control unit 2 transmits a thirty-two-bit control address, followed by one parity bit. The bits are transmitted in synchronization with a clock signal generated in the supervisory and control unit 2, each bit occupying one clock cycle.

The control address designates a specific circuit in the data input/output unit 1-m ($1 \leq m \leq M$) with which the supervisory and control unit 2 is communicating, and indicates whether the supervisory and control unit 2 wants to receive supervisory information, or transmit control information. After an eight-bit idle interval, either the data input/output unit 1-m transmits thirty-two bits of supervisory information to the supervisory and control unit 2, or the supervisory and control unit 2 transmits thirty-two bits of control information to the data input/output unit 1-m. These thirty-two bits are also followed by a parity bit. In all, the communication period comprises seventy-four bits. The eight-bit idle interval gives the data input/output unit 1-m time to switch from the receiving state to the transmitting state.

This data format is also used in conventional three-wire serial interfaces for communication between a supervisory and control unit and data input/output units.

First Embodiment

Figure 3:
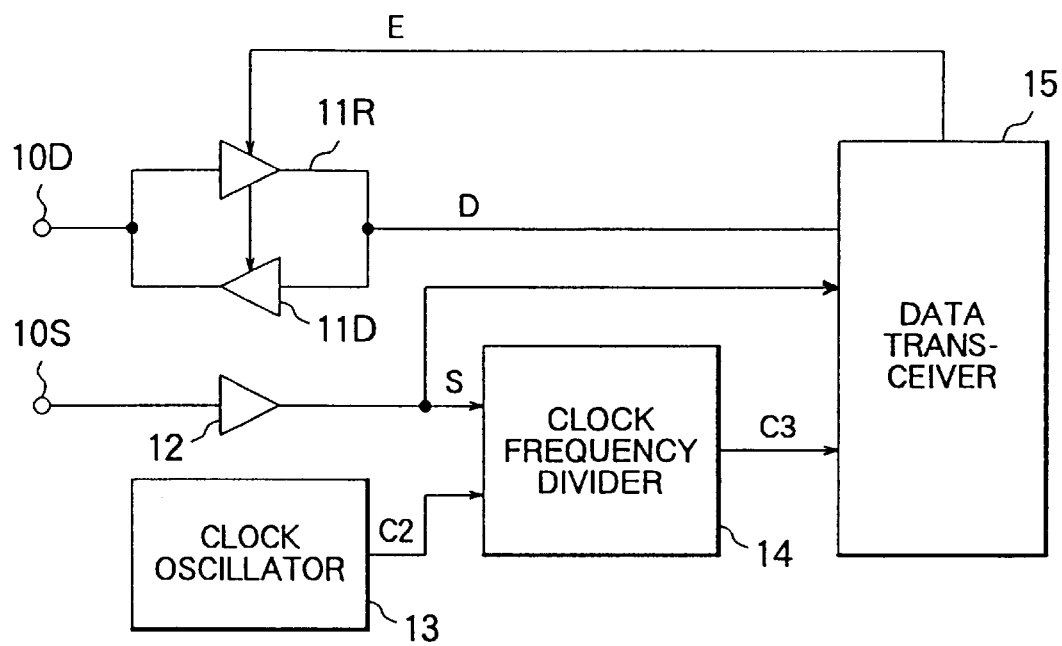
FIG. 3 is a block diagram of a serial interface circuit according to a first embodiment of the invention.

Referring to FIG. 3, the first embodiment is a serial interface circuit that is coupled to a partner interface circuit by a data signal line and a scan signal line. The data signal line (not shown) is connected at a data input/output terminal 10D; the scan signal line (not shown) is connected at a scan input terminal 10S. In the serial interface circuit, the data input/output terminal 10D is coupled to a data signal receiver 11R and a data signal driver 11D, while the scan input terminal 10S is coupled to a scan signal receiver 12. The serial interface circuit also comprises a clock oscillator 13, a clock frequency divider 14, and a data transceiver 15.

The data signal receiver 11R provides the data transceiver 15 with a data signal received at the data input/output terminal 10D. The data signal driver 11D drives the data input/output terminal 10D according to data supplied by the data transceiver 15. The data signal receiver 11R and data signal driver 11D are both controlled by an enable signal E from the data transceiver 15, in such a way that when the data signal receiver 11R is enabled, the data signal driver 11D is disabled, and vice versa. The enable signal E controls the direction of communication on the data signal line. During non-communication periods, the data signal receiver 11R is enabled and the data signal driver 11D is disabled.

The scan signal receiver 12 provides the clock frequency divider 14 and data transceiver 15 with a scan signal S received at the scan input terminal 10S.

The clock oscillator 13 generates a second clock signal C2 having a frequency eight times higher than the frequency of a first clock signal (C1) used in the partner interface circuit in the supervisory and control unit. The first clock signal C1 is not transmitted from the supervisory and control unit to the serial interface circuit, so the second clock signal C2 is not synchronized with the first clock signal C1.

The clock frequency divider 14 is a divide-by-eight counter that generates a divided clock signal C3 with a phase referenced to the scan signal S. Following each transition of the scan signal S from the inactive level to the active level, referred to below as an active transition, the clock frequency divider 14 forces an initial low-to-high transition of the divided clock signal C3, then proceeds to output the divided clock signal at a frequency equal to one-eighth the frequency of the second clock signal C2, in phase with the initial low-to-high transition. The divided clock signal C3 has the same frequency as the first clock signal C1 used in the supervisory and control unit, but is not directly synchronized with the first clock signal C1.

The data transceiver 15 latches serial input data provided from the data signal receiver 11R, and sends serial output data to the data signal driver 11D. These operations are both performed in synchronization with the divided clock signal C3, during communication periods indicated by the scan signal S, according to instructions provided by the supervisory and control unit 2 in the control address at the beginning of each communication period. The data transceiver 15 has an internal counter (not shown) that counts cycles of the divided clock signal C3, starting from each active transition of the scan signal S, to determine which data bit is currently being transmitted or received.

Next, the operation of the first embodiment will be described. The active level of the scan signal S will be the high level.

Figure 4:
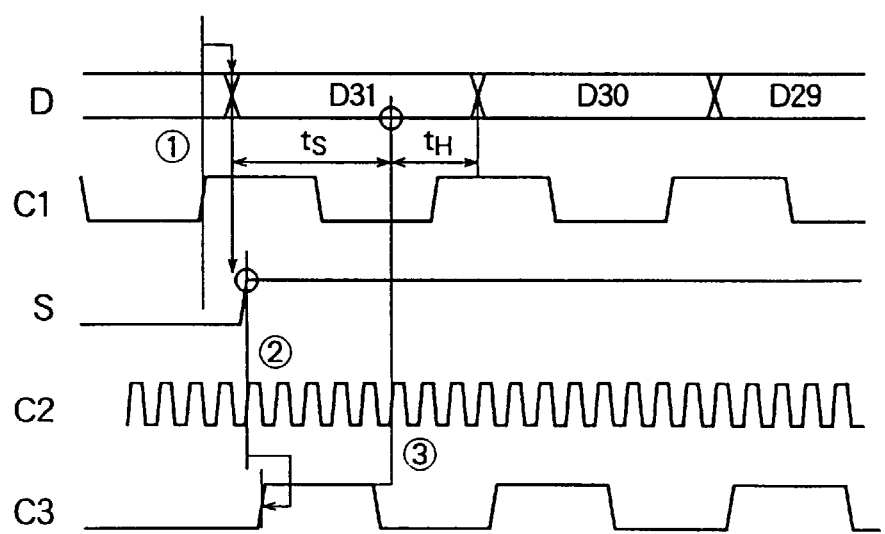
FIG. 4 is a timing diagram illustrating the operation of the first embodiment.

Referring to FIG. 4, to begin a communication period with a data input/output unit 1-m in which the serial interface circuit is installed, the partner interface circuit in the supervisory and control unit 2 drives the scan signal S to the active level in synchronization with a low-to-high transition of the first clock signal C1, indicated by the circled numeral one (1). At substantially the same time, the partner interface circuit begins transmitting the first bit (D31) of the control address on the data signal line.

The data signal receiver 11R in the serial interface circuit receives the active scan signal S at a time (2), with a certain propagation delay from time (1). Operating in synchronization with the second clock signal C2, the clock frequency divider 14 detects the active transition of the scan signal, and responds by driving the divided clock signal C3 high. Thereafter, the clock frequency divider 14 drives the divided clock signal C3 high and low at regular intervals of four cycles of the second clock signal C2, thus dividing the frequency of the second clock signal C2 by eight. The divided clock signal C3 is out of phase with the first clock signal C1 by at most about one-eighth of one cycle of clock signals C1 and C3.

The data transceiver 15 latches the serial data D received by the data signal receiver 11R in synchronization with high-to-low transitions of the divided clock signal C3, actually slightly lagging these transitions, due to signal propagation delays. The first bit D31 of the control address, for example, is latched at time (3). Due to the propagation delays, the latching does not occur at the exact center of the bit interval, but since the divided clock signal C3 is out of phase with the first clock signal C1 by at most about one-eighth of the length of the bit interval, the latching setup ($t_S$) and hold ($t_H$) timing requirements are easily satisfied.

Subsequent serial data bits D30, D29, . . . are received in the same way. After receiving the thirty-two control address bits and their parity bit, the data transceiver 15 performs a parity check. If the parity check passes, the data transceiver 15 analyzes the control address to determine which circuit in the data input/output unit 1-m is designated for communication, and whether the designated circuit is to transmit supervisory data or receive control data.

If the designated circuit is to receive, the data transceiver 15 leaves the data signal receiver 11R enabled and the data signal driver 11D disabled. After the idle period indicated in FIG. 2, the data transceiver 15 receives thirty-two bits of control data and a parity bit, performs another parity check, and supplies the control data to the designated circuit if the parity check passes.

If the designated circuit is to transmit, the data transceiver 15 changes the state of the enable signal E so that the data signal receiver 11R is disabled and the data signal driver 11D is enabled, and sends the designated circuit a request for supervisory data. After the idle period, the data transceiver 15 outputs thirty-two bits of supervisory data provided by the designated circuit, and one parity bit generated by the data transceiver 15. These bits are output in synchronization with the divided clock signal C3, and transmitted by the data signal driver 11D. The partner interface circuit in the supervisory and control unit 2 receives the bits in synchronization with the first clock signal C1, but since the first clock signal and divided clock signal are out of phase by at most one-eighth of one cycle, if the partner interface circuit has adequate timing margins, the setup and hold timing requirements will again be satisfied.

At the end of the communication period, the partner interface circuit in the supervisory and control unit 2 drives the scan signal S to the inactive state. If the data signal driver 11D was enabled to transmit, the data transceiver 15 now returns the enable signal E to its normal state, disabling the data signal driver 11D and enabling the data signal receiver 11R. The serial interface circuit then stands by in readiness for the start of next communication period.

During these operations, the partner interface circuit in the supervisory and control unit 2 operates exactly as if a conventional three-wire interface were in use. Not transmitting the first clock signal does not require any modification of the partner interface circuit; it suffices to leave the clock output terminal unconnected. The slight phase difference between the first clock signal and divided clock signal is absorbed by the setup and hold timing margins of the partner interface circuit. If necessary, the clock oscillator 13 can generate a second clock signal with a frequency N times higher than the frequency of the first clock signal, where N is an integer greater than eight, and the clock frequency divider 14 can divide this frequency by N, thereby reducing the phase difference.

Second Embodiment

In the second embodiment, the serial interface circuit and its partner interface circuit are linked by a data signal line and a clock signal line. The first four bits of the control address transmitted by the partner interface circuit at the beginning of each communication period constitute a fixed synchronization pattern. Generating this four-bit synchronization pattern may require some changes in the software that generates the control address, but little or no modification of the hardware of the supervisory and control unit 2 is required.

Figure 5:
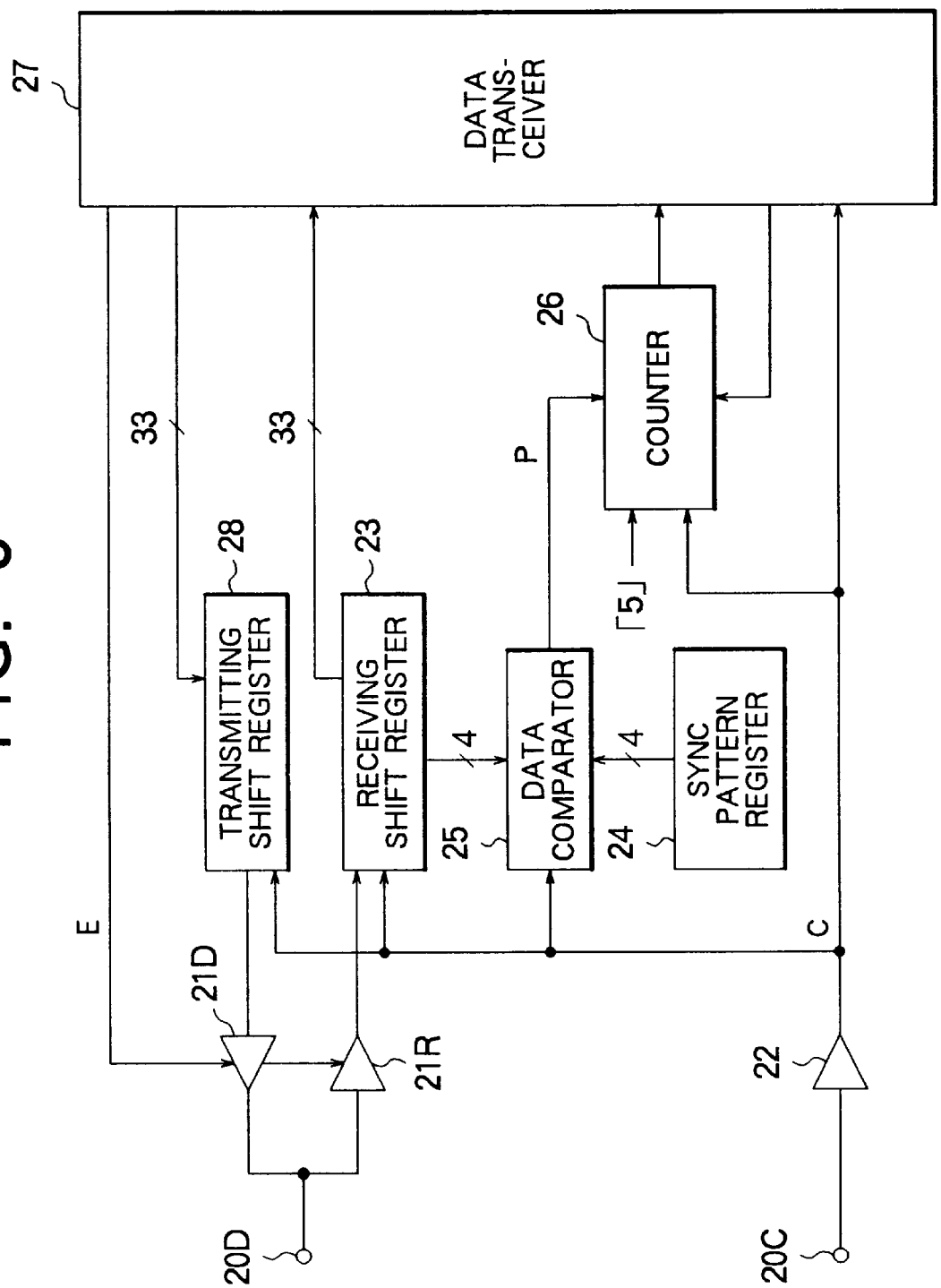
FIG. 5 is a block diagram of a serial interface circuit according to a second embodiment of the invention.

Referring to FIG. 5, the serial interface circuit in the second embodiment has a data input/output terminal 20D connected to the data signal line, and a clock input terminal 20C connected to the clock signal line. The data input/output terminal 20D is connected to a data signal receiver 21R and a data signal driver 21D, which are controlled by an enable signal E as in the first embodiment. The clock input terminal 20C is coupled to a clock signal receiver 22.

The other components of the serial interface circuit are a receiving shift register 23, a four-bit synchronization pattern register 24, a data comparator 25, a counter 26, a data transceiver 27, and a transmitting shift register 28. These components all operate in synchronization with the clock signal C received by the clock signal receiver 22, except for the synchronization pattern register 24, which requires no synchronization.

Data received by the data signal receiver 21R are shifted one bit at a time into the receiving shift register 23, which has a length of thirty-three bits. The data comparator 25 compares the first four store bits in the receiving shift register 23 (the four bits received most recently) with the four-bit contents of the synchronization pattern register 24, reading four bits in parallel from the first four stages of the receiving shift register 23, and four bits in parallel from the synchronization pattern register 24. One comparison is performed per cycle of the clock signal C.

The synchronization pattern register 24 stores the same four-bit synchronization pattern as is transmitted by the partner interface circuit at the beginning of each communication period.

Upon detecting agreement between the bit pattern stored in the synchronization pattern register 24 and the first four bits at data stored in the receiving shift register 23, the data comparator 25 sends a preset signal P to the counter 26, causing the counter 26 to load a fixed value of five. The counter 26 then counts up from this value, incrementing once per cycle of the clock signal C.

The data transceiver 27 reads the count value in the counter 26 to determine which data bit is currently being transmitted or received. At appropriate times, as indicated by the count value, the data transceiver 27 reads thirty-three bits in parallel from the receiving shift register 23, loads thirty-three bits in parallel into the transmitting shift register 28, or resets the counter 26.

The transmitting shift register 28 shifts bits out one at a time to the data signal driver 21D, in synchronization with the clock signal C. The data signal driver 21D transmits the serial data thus output from the transmitting shift register 28 through the data signal line to the partner interface circuit.

Next the operation of the second embodiment will be described.

Figure 6:
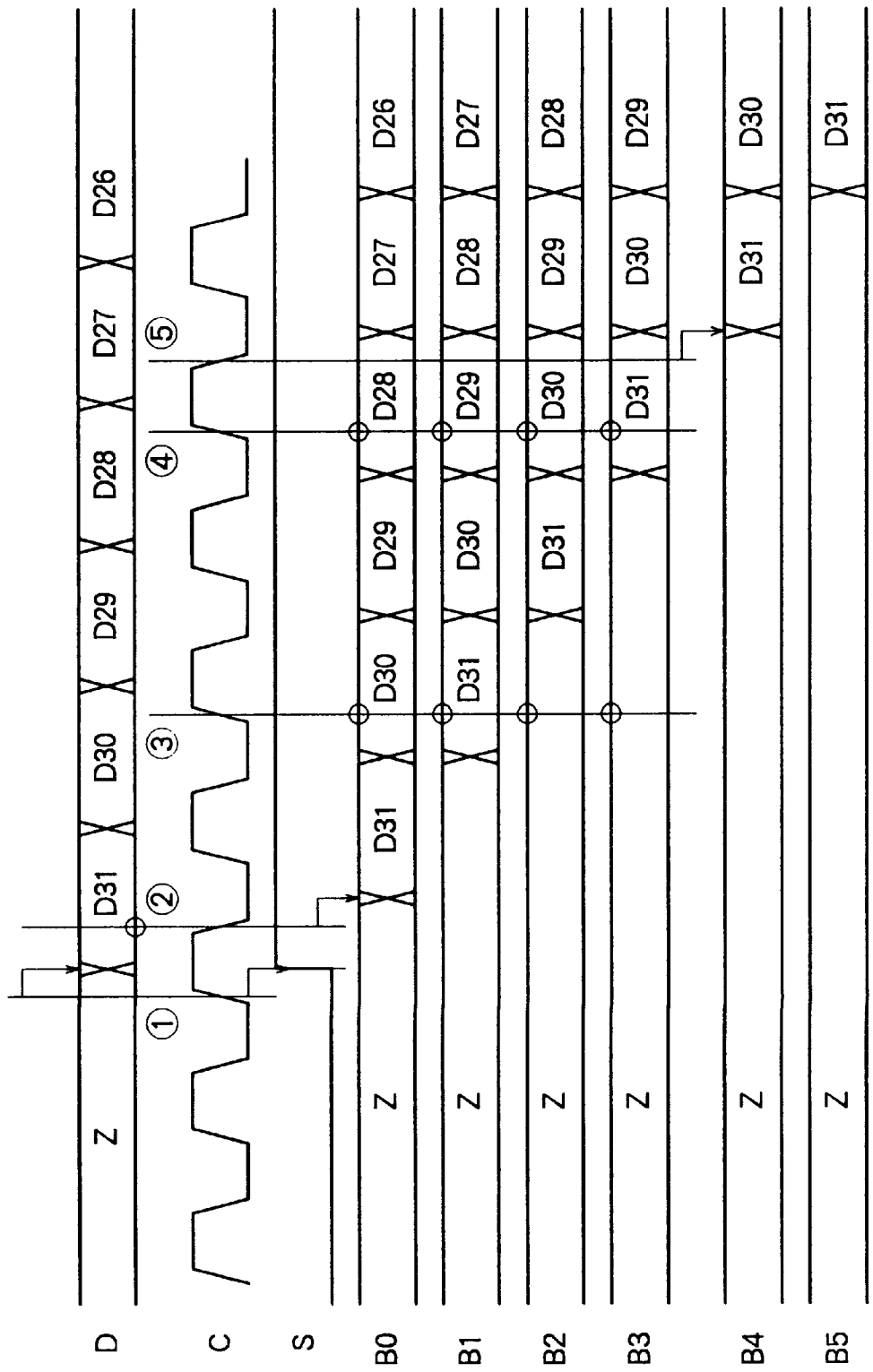
FIG. 6 is a timing diagram illustrating the operation of the second embodiment.

Referring to FIG. 6, the partner interface circuit in the supervisory and control unit 2 operates as if a three-wire interface were being used, generating a serial data signal D and scan signal S in synchronization with the clock signal C. To initiate a communication period, in synchronization with a low-to-high transition of the clock signal C as shown at time (1), the partner interface circuit drives the scan signal S to the active level and begins transmitting the first bit (D31) of the control address.

Bit D31 is followed by other bits D30, D29, . . . . Bits D31 to D28 constitute the synchronization pattern.

The scan signal S is used internally in the supervisory and control unit 2, but is not transmitted to the serial interface circuit in the data input/output unit 1-m.

Lines B0 to B5 in FIG. 6 indicate the contents of the first six stages of the receiving shift register 23. The letter Z indicates don't-care data, which the serial interface circuit receives during non-communication periods. The don't-care data Z may have any values that cannot be confused with the synchronization pattern. To avoid accidental coincidence between the don't-care data and the synchronization pattern, the data signal line is preferably held at a constant level during these non-communication periods, so that the don't-care data Z all have the same value, and the synchronization pattern has at least two bits different from this value.

At time (2), the first bit (D31) of the control address is received by the data signal receiver 21 and shifted into the first stage (B0) of the receiving shift register 23, in synchronization with a high-to-low transition of the clock signal C. One clock cycle later, this bit D31 is shifted from the first stage B0 to the second stage B1, while the second received bit D30 is shifted into the first stage B0.

The data comparator 25 compares the contents of the first four stages (B0 to B3) of the receiving shift register 23 with the contents of the synchronization pattern register 24 at each low-to-high transition of the clock signal C. One such comparison is made at time (3), for example, but agreement is not detected at this time.

At time (4), however, the first four bits D31 to D28 of the control address have been shifted into the receiving shift register 23, and are stored in stages B0 to B3. Since these four bits constitute the synchronization pattern, they match the contents of the synchronization pattern register 24, and the data comparator 25 outputs a preset signal to the counter 26.

At the next high-to-low transition of the clock signal C at time (5), the synchronization pattern D31 to D28 is shifted into stages B1 to B4 of the receiving shift register 23, while the next control address bit S27 is received and shifted into stage B0. While this shift is taking place, the value five is being loaded into the counter 26. The count value in counter 26 thus indicates the number of valid received bits in the receiving shift register 23.

Reception of the control address and its parity bit continues in this way. When the counter 26 reaches a count of thirty-three, the data transceiver 27 reads, in parallel, the thirty-three-bit contents of the receiving shift register 23, comprising thirty-two control address bits and one parity bit, and performs a parity check.

If the parity check passes, and if the control address indicates that a designated circuit in the data input/output unit 1-m is to receive control data, the data transceiver 27 waits until the counter 26 indicates a count of seventy-four, then reads the thirty-three-bit contents of the receiving shift register 23, which now comprise thirty-two control data bits and one parity bit, and performs another parity check. If this parity check also passes, the data transceiver 27 sends the thirty-two bits of control data to the circuit that was designated in the control address. The data transceiver 27 also resets the counter 26 at this time.

If the control address indicates that a designated circuit in the data input/output unit 1-m is to transmit supervisory data, then before the counter 26 reaches a count of forty-one, the data transceiver 27 obtains the supervisory data (thirty-two bits) from the designated circuit, generates a parity bit, and changes the state of the enable signal E to enable the data signal driver 21D and disable the data signal receiver 21R. When the counter 26 indicates forty-one, the data transceiver 27 loads the supervisory data and parity bit in parallel, thirty-three bits in all, into the transmitting shift register 28.

As the counter 26 counts from forty-two to seventy-four, the transmitting shift register 28 shifts the loaded bits out one by one to the data signal driver 21D, which transmits the bits on the data signal line to the partner interface circuit in the supervisory and control unit 2, in synchronization with the clock signal C. When the counter 26 reaches a count of seventy-five, the data transceiver 27 disables the data signal driver 21D, enables the data signal receiver 21R, and resets the counter 26.

In reading the receiving shift register 23 and counter 26, and writing to the transmitting shift register 28, the data transceiver 27 operates in synchronization with the clock signal C. In checking and analyzing the control address, however, the data transceiver 27 operates on a faster clock signal (not shown in the drawings), because the analysis must be completed within the idle period, which lasts for only eight cycles of clock signal C. Third Embodiment In the third embodiment, the serial interface circuit and its partner interface circuit are coupled by a single data line. No clock or scan signals are transmitted between the two interface circuits. As in the second embodiment, the partner interface circuit sends a predetermined four-bit synchronization pattern at the beginning of each communication period. Aside from transmitting a synchronization pattern, and not transmitting clock and scan signals, the partner interface circuit operates as if a conventional three-wire interface were in use.

Figure 7:
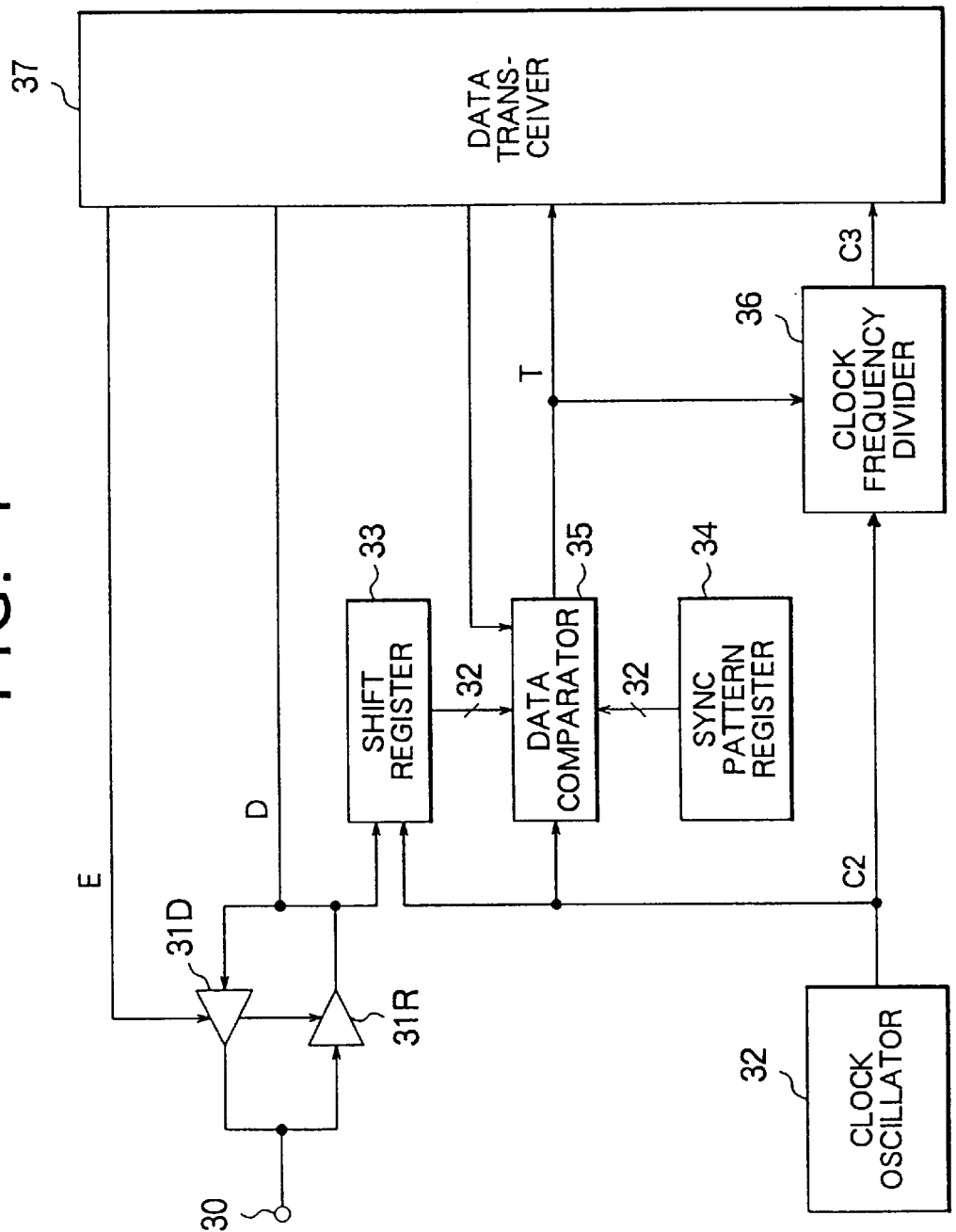
FIG. 7 is a block diagram of a serial interface circuit according to a third embodiment of the invention.

Referring to FIG. 7, the serial interface circuit in the third embodiment has a data input/output terminal 30 connected to the data signal line, a data signal receiver 31R, a data signal driver 31D, a clock oscillator 32, a shift register 33, a synchronization pattern register 34, a data comparator 35, a clock frequency divider 36, and a data transceiver 37.

The data signal receiver 31R and data signal driver 31D operate like the corresponding elements in the preceding embodiments, being enabled and disabled by an enable signal E from the data transceiver 37.

The clock oscillator 32 operates in the same way as the clock oscillator 13 in the first embodiment, generating a second clock signal C2 with a frequency eight times higher than the frequency of the first clock signal C1 used internally in the partner interface circuit in the supervisory and control unit 2. The second clock signal C2 is supplied to the shift register 33, data comparator 35, and clock frequency divider 36.

The shift register 33 shifts data received from the data signal receiver 31R in synchronization with the second clock signal C2. The shift register 33 has a length of thirty-two bits.

The synchronization pattern register 34 stores thirty-two bit data, in which the first eight bits have the value of the first bit of the synchronization pattern, the second eight bits have the value of the second bit of the synchronization pattern, the third eight bits have the value of the third bit of the synchronization pattern, and the last eight bits have the value of the fourth bit of the synchronization pattern. The synchronization pattern register 34 accordingly stores a bit pattern matching the synchronization pattern, except that each bit is repeated eight times.

The data comparator 35 compares the thirty-two bits stored in the shift register 33 with the bit pattern stored in the synchronization pattern register 34, and sends a synchronization signal T to the clock frequency divider 36 and data transceiver 37. Upon detecting agreement between the shift register 33 and synchronization pattern register 34, the data comparator 35 sets the synchronization signal T to the active level, then holds the synchronization signal T at the active level until notified by the data transceiver 37 of the end of the communication period.

The clock frequency divider 36 operates like the clock frequency divider in the first embodiment, dividing the frequency of the second clock signal C2 by eight to generate a divided clock signal C3, which is supplied to the data transceiver 37. The phase of the divided clock signal C3 is referenced to the active transition of the synchronization signal T.

The data transceiver 37 treats the divided clock signal C3 as if it were the first clock signal C1 used internally in the partner interface circuit in the supervisory and control unit 2, and treats the synchronization signal T as a signal delayed by four clock cycles from the scan signal S used internally in the partner interface circuit. On the basis of these signals, the data transceiver 37 sends data D to the data signal driver 31D, receives data D from the data signal receiver 31R, and controls the enable signal E. The data transceiver 37 has an internal counter (not shown) that indicates bit positions in the data being transmitted and received, and operates in essentially the same way as the data transceiver in the first embodiment.

Next, the operation of the third embodiment will be described.

At the beginning of a communication period, the partner interface circuit in the supervisory and control unit 2 sends the four-bit synchronization pattern in synchronization with the first clock signal C1 mentioned above. The shift register 33 receives this four-bit pattern in synchronization with the second clock signal C2, which has a frequency eight times higher than the frequency of the first clock signal C1. Each bit of the synchronization pattern is therefore shifted into the shift register 33 eight times.

When the entire synchronization pattern has been received, there will be a timing at which the shift register 33 contains eight consecutive copies of each of the four synchronization bits. This timing will be delayed by substantially one cycle of the second clock signal C2, or one-eighth of one cycle of the first clock signal C1, from a low to-high transition of the first clock signal C1. The exact delay is unpredictable, because it depends on the phase relationship between the first and second clock signals C1 and C2, which are not mutually synchronized.

At this timing, the data comparator 35 detects agreement between the contents of the shift register 33 and synchronization pattern register 34, and activates the synchronization signal T. The clock frequency divider 36 responds by forcing a low-to-high transition of the divided clock signal C3. Thereafter, the divided clock signal C3 is output at the same frequency as the first clock signal C1, lagging the first clock signal C1 in phase by approximately one-eighth of one cycle.

The active transition of the synchronization T notifies the data transceiver 37 that a communication period has begun, and that the first four bits of the control address, constituting the synchronization pattern, have already been received. The data transceiver 37 sets its internal counter to indicate this information, then latches the remaining twenty-eight bits of the control address, and the following parity bit, in synchronization with high-to-low transitions of the divided clock signal C3. The data transceiver 37 receives these bits directly from the data signal receiver 31R, Knowing the values of the four synchronization bits, the data transceiver 37 is able to carry out a parity check. If the parity check passes, the data transceiver 37 proceeds to transmit supervisory data or receive control data as in the first embodiment.

If the partner interface circuit in the supervisory and control unit 2 has adequate timing margins, the lag of substantially one-eighth of a cycle between the first clock signal C1 and divided clock signal C3 will not violate setup and hold timing requirements. If necessary, the lag can be reduced by increasing the frequency of the second clock signal.

As described above, the invented serial interface circuit enables a supervisory and control unit to communicate with a data input/output unit over only one or two signal lines, instead of the conventional three signal lines, with little or no modification to the supervisory and control unit and the partner interface circuit therein. The installation and maintenance problems caused by overcrowded wiring, and the problem of crosstalk between signal lines, can accordingly be reduced, without the need for extensive modifications that might jeopardize the integrity of the equipment in which the invention is used.

As noted above, the frequency of the second clock signal in the first and third embodiments is not limited to eight times the frequency of the first clock signal. Provided setup and hold timing requirements are satisfied, the frequency of the second clock signal can be any multiple N of the frequency of the first clock signal, N being an integer greater than one.

The scan signal in the first embodiment need not be held in the active state for the entire communication period. It suffices for there to be an active transition at the beginning of the communication period.

The data transceiver in the second embodiment can receive data directly from the data signal receiver and send data directly to the data signal driver, as in the third embodiment, instead of transmitting and receiving through the shift registers 23 and 28. In this case the transmitting shift register 28 can be omitted, and the receiving shift register 23 need only have a length equal to the length of the synchronization pattern.

The length of the synchronization pattern in the second and third embodiments is not limited to four bits; synchronization patterns with other numbers of bits can be used. The synchronization pattern need not be long, because it is used only to indicate the beginning of a communication period. The length of the synchronization pattern is preferably greater than one bit, however, to reduce the probability of errors.

The format of data transmitted by the invented serial interface circuit is not limited to the format shown in FIG. 2.

The transmitted and received data are not limited to supervisory and control data, and the transmitting and receiving serial interface circuits need not be connected in the star topology shown in FIG. 1.

Although the preceding embodiments described a bi-directional serial interface circuit, the invention can also be practiced in a serial interface circuit that only receives serial data.

The invention is not limited to use in telecommunication equipment. There are many systems currently using a three-wire interface that would benefit frog a simple means of changing to a two-wire or one-wire interface.

Those skilled in the art will recognize that further variations are possible within the scope claimed below.

What is claimed is:

1. A serial interface circuit coupled by a data signal line and a scan signal line to a partner interface circuit, receiving on the scan signal line a scan signal indicating when a communication period begins, and receiving data on the data signal line for at least part of said communication period, said partner interface circuit transmitting said data in synchronization with a first clock signal having a first frequency, said first clock signal not being transmitted to said serial interface circuit, said serial interface circuit comprising:

a clock oscillator generating a second clock signal having a frequency equal to N times said first frequency, N being an integer greater than one;

a clock frequency divider, coupled to said clock oscillator, for dividing the frequency of said second clock signal by N, thereby generating a divided clock signal having a phase referenced to said scan signal; and a data transceiver, coupled to said clock frequency divider, for receiving data from said data signal line in synchronization with said divided clock signal;

wherein said data transceiver also transmits data on said data signal line, in synchronization with said divided clock signal.

2. A serial interface circuit coupled by a data signal line and a scan signal line to a partner interface circuit, receiving on the scan signal line a scan signal indicating when a communication period begins, and receiving data on the data signal line for at least part of said communication period, said partner interface circuit transmitting said data in synchronization with a first clock signal having a first frequency, said first clock signal not being transmitted to said serial interface circuit, said serial interface circuit comprising:

a clock oscillator generating a second clock signal having a frequency equal to N times said first frequency, N being an integer greater than one;

a clock frequency divider, coupled to said clock oscillator, for dividing the frequency of said second clock signal by N, thereby generating a divided clock signal having a phase referenced to said scan signal; and a data transceiver, coupled to said clock frequency divider, for receiving data from said data signal line in synchronization with said divided clock signal;

wherein said clock frequency divider causes a specific type of transition of said divided clock signal to occur when an inactive-to-active transition of said scan signal occurs.

3. A serial interface circuit coupled to a partner interface circuit by a data signal line and a clock signal line, receiving a clock signal on the clock signal line and data on the data signal line, the data being transmitted in separate communication periods, the data in each communication period beginning with a synchronization pattern, said serial interface circuit comprising:

a receiving shift register for receiving and storing data from said data signal line in synchronization with said clock signal, said receiving shift register having a length at least equal to a length of said synchronization pattern;

a data comparator, coupled to said receiving shift register, for detecting agreement between data stored in said receiving shift register and said synchronization pattern; and a data transceiver, coupled to said data comparator, for receiving data from said data signal line, in synchronization with said clock signal, after said data comparator detects said agreement.

4. The serial interface circuit of claim 3, wherein said data transceiver also transmits data on said data signal line, in synchronization with said clock signal.

5. The serial interface circuit of claim 4, further comprising a transmitting shift register coupled to said data signal line, wherein said data transceiver transmits data on said data signal line by placing the data in said transmitting shift register.

6. The serial interface circuit of claim 3, wherein said synchronization pattern comprises more than one bit.

7. The serial interface circuit of claim 3, wherein the length of said receiving shift register is greater than the length of said synchronization pattern.

8. The serial interface circuit of claim 7, wherein said data transceiver receives data from said data signal line by reading said data from said receiving shift register.

9. The serial interface circuit of claim 8, wherein said data transceiver reads first data from said receiving shift register, and if said first data indicate that said data transceiver is to receive further data, said data transceiver waits for a predetermined number of cycles of said clock signal, then reads said further data from said receiving shift register, while if said first data indicate that said data transceiver is to transmit, said data transceiver transmits data on said data signal line, these operations constituting one said communication period.

10. A serial interface circuit coupled to a partner interface circuit by a data signal line, receiving from said partner interface circuit data transmitted in synchronization with a first clock signal having a first frequency, said first clock signal not being transmitted to said serial interface circuit, said data being transmitted in separate communication periods, the data in each communication period beginning with a synchronization pat tern, said serial interface circuit comprising:

a clock oscillator generating a second clock signal having a frequency equal to N times said first frequency, N being an integer greater than one;

a shift register, coupled to said clock oscillator, for receiving and storing data from said data signal line in synchronization with said second clock signal, said shift register having a length at least N times as long as a length of said synchronization pattern;

a data comparator, coupled to said shift register and generating a synchronization signal, for driving said synchronization signal from an inactive state to an active state when the data stored in said shift register have a bit pattern matching a pattern in which each bit in said synchronization pattern is consecutively repeated N times;

a clock frequency divider, coupled to said clock oscillator, for dividing the frequency of said second clock signal by N, thereby generating a divided clock signal having a phase referenced to said synchronization signal; and a data transceiver, coupled to said clock frequency divider, for receiving data from said data signal line in synchronization with said divided clock signal, starting when said synchronization signal is driven to said active state.

11. The serial interface circuit of claim 10, wherein said data transceiver also transmits data on said data signal line, in synchronization with said divided clock signal.

12. The serial interface circuit of claim 11, wherein said data transceiver receives first data from said data signal line, and if said first data indicate that said data transceiver is receive further data, said data transceiver receives said further data from said data signal line, while if said first data indicate that if said data transceiver is to transmit, said data transceiver transmits data on said data signal line, these operations constituting one said communication period.

13. The serial interface circuit of claim 10, wherein said clock frequency divider causes a specific type of transition of said divided clock signal to occur when an inactive-to-active transition of said synchronization signal occurs.

14. The serial interface circuit of claim 10, wherein said synchronization pattern comprises more than one bit.

* * * * *